Patented May 22, 1951

2,553,806

UNITED STATES PATENT OFFICE 2,553,806

ENTERIC COMPOSITION AND METHOD OF MAKING SAME

Herman H. Bogin, Detroit, and Ernest R. Jones, Grosse Pointe Farms, Mich., assignors to Parke, Davis & Company, Detroit, Mich., a corporation of Michigan No Drawing. Application July 12, 1950, Serial No. 173,484

10 Claims. (Cl. 167—82)

The invention relates to medicaments having enteric properties and to a method for preparing the same. More particularly, the invention relates to a solid enteric powder or granulation containing a water-insoluble therapeutic liquid.

This application is a continuation-in-part of the copending application Serial No. 595,884, filed May 25, 1945, now abandoned.

A substance which is enteric is one which does not dissolve in the normal acid juices of the stomach but does dissolve in the alkaline fluids of the intestine.

According to the art prior to the present invention, the only way in which an orally administered therapeutic liquid could be protected from attack by the gastric juices of the stomach was to enclose the liquid in a separate enteric capsule. The present invention provides a method whereby the therapeutic liquid itself is converted into a solid enteric product thereby avoiding the necessity of using a separate enteric capsule.

According to the present invention, a water-immiscible therapeutic liquid is emulsified with an aqueous solution of an alkali metal carboxylate salt of a partial ester of a polycarboxylic acid such as the sodium salt of cellulose acetate phthalate. The water is then removed from the emulsion in a vacuum drier thereby obtaining a solid substance which is ground or otherwise comminuted to produce a powder or granulation which, when orally administered, does not dissolve in the normal acid juices of the stomach but does dissolve in the alkaline fluids of the intestine.

Therapeutic liquids which may be rendered enteric by this invention are, in general, water-immiscible liquids which are therapeutic either because of the inherent therapeutic properties of the liquid itself or because they contain a therapeutic ingredient incorporated therein by solution or suspension. Thus the therapeutic liquid can be a therapeutic oil, a germicidal oily liquid or a solution or suspension of a medicinial substance in an oil or other water-insoluble liquid. Because of the fact that the therapeutic oil is rendered enteric by the present invention, it can be such a substance as is normally unsuitable for oral ingestion because it causes irritation in the stomach either because of its inherent nature or because of the condition of the patient who cannot tolerate such a liquid in the stomach.

A typical example of a therapeutic liquid which is normally unsuitable for oral administration but which can be rendered suitable by means of the present invention, is disecondary hexylresorcinol, a germicide disclosed in the United States patent to Rawlins and Hamilton No. 2,107,307 issued February 8, 1938. Other therapeutic liquids which can be used in the present invention include aldehydes such as paraldehyde, halogen derivatives of aldehydes such as chloral or chloralhydrate, phenols, and alkali halides such as sodium bromide.

Examples of solid medicaments which can be placed in suspension in a water-insoluble liquid and then rendered enteric in accordance with this invention include the sulfa drugs such as sulfamerizene, sulfadiazine, sulfathiazole, sulfathiazine and sulfanilamide. Other medicinal materials include the anterior pituitary-like sex hormone (choriconic gonadotropin), corpora lutea, mammary substance, ovarian substance, and other hormones. A specific example is the tannate of $\beta$-hypophamine, a therapeutic agent produced from tannic acid and a product derived from the posterior lobe of the pituitary gland as disclosed in the United States patent to Jones and Kamm No. 2,399,742 issued May 7, 1946.

Instead of cellulose acetate phthalate, other cellulose derivatives may be used prepared by methods described in United States Patents Nos. 2,093,462, 2,093,464 and 2,126,460. Such derivatives may be polycarboxylic acid partial esters of cellulose esters of lower aliphatic mono-carboxylic acids containing 5 to 25% (preferably 8–15%) free carboxyl groups by-weight and include cellulose acetate succinate, cellulose acetate maleate, cellulose phthalate and cellulose succinate. All are used in the form of an aqueous solution of the sodium, potassium, or lithium salts of the cellulose derivatives.

The invention is further illustrated by the following examples:

Example 1

30 grams of cellulose acetate phthalate are mixed with 7.5 grams of sodium bicarbonate and 270 grams of hot water (77° C.) are added with constant stirring until solution is obtained. The warm solution is now vigorously agitated and 15 grams of disecondary hexylresorcinol are added. After a homogeneous emulsion is obtained, the material is placed in a vacuum drier at 66° C. and dried. The solid material is then run through a thirty mesh screen, yielding a powder which can readily be encapsulated or put in tablet form.

Example 2

20 grams cellulose acetate phthalate are mixed with 5 grams of sodium bicarbonate and 12 grams of glucose. 110 grams of hot water (80° C.) are added with constant mixing until solution is effected. The warm solution is vigorously agitated and 20 grams of disecondary hexylresorcinol (heated to 55° C.) are added. After a homogeneous appearing emulsion or mixture is obtained, the material is placed in a vacuum drier for 24 hours at 66° C. The resulting solid material is run through a thirty mesh screen to yield a powder which can readily be encapsulated or put up in tablets. This material upon test gave a quantitative yield of disecondary hexylresorcinol with no loss of activity.

Example 3

850 grams cellulose acetate phthalate are mixed with 212 grams sodium bicarbonate and the mixture is dissolved in 5100 grams of hot water (80° C.). 425 grams sugar are then dissolved in this solution. In another container, .2 gram of the tannate of β-hypophamine and 1 gram β-lactone are suspended in 1000 cc. peanut oil. The warm cellulose acetate phthalate solution is vigorously agitated while an oil suspension of said tannate (warmed to 60° C.) is slowly added to obtain an emulsion of the oil-in-water type. The resulting emulsion is dried in a vacuum drier at 66° C. for 24 hours. The dry material is ground up to about 30 mesh and washed with benzene to remove free oil. The benzene is then removed from the granulation by drying at 35° C.

Example 4

2.6 grams of sodium carbonate monohydrate are mixed with 13 grams of cellulose acetate phthalate. The mixture is dissolved in 10 grams of glucose and 48 grams of water at 65° C. and the solution heated at 65° C. for 24 hours. In another container, one million units of penicillin (as the calcium salt) are suspended in 20 cc. of peanut oil and the suspension heated to 49° C.

The peanut oil suspension is emulsified in the cellulose-acetate-phthalate mixture while blanketing the mixture with carbon dioxide. The emulsion is run off in thin sheets and dried at 38° C. for 24 hours. The dry sheets are then ground up into a 20 mesh granulation. Any free oil is washed off with benzene. The granulation is then ready for use, and can be filled into capsules.

What we claim as our invention is:

1. A process which comprises emulsifying a water-insoluble therapeutic liquid with an alkali metal carboxylate salt of a partial ester of a polycarboxylic acid and a cellulose ester of a lower aliphatic monocarboxylic acid and drying the resulting product whereby a stable powder having enteric properties is formed.

2. A process which comprises emulsifying a water-insoluble therapeutic liquid with a sodium salt of cellulose acetate phthalate and drying the resulting product whereby a stable powder having enteric properties is formed.

3. A process which comprises emulsifying water-insoluble, liquid disecondary hexylresorcinol with a sodium salt of cellulose acetate phthalate and drying the resulting product whereby a stable powder having enertic properties is formed.

4. A process which comprises emulsifying a water-insoluble oil suspension of penicillin with a sodium salt of cellulose acetate phthalate and drying the resulting product whereby a stable powder having enteric properties is formed.

5. A process which comprises emulsifying a water-insoluble oil suspension of pitressin tannate with a sodium salt of cellulose acetate phthalate and drying the resulting product whereby a stable powder having enteric properties is formed.

6. A therapeutic agent having enteric properties in the form of a solid granulation which includes a dried emulsified mixture of an alkali metal carboxylate salt of a partial ester of a polycarboxylic acid and a cellulose ester of a lower aliphatic monocarboxylic acid and a water-insoluble therapeutic liquid.

7. A therapeutic agent having enteric properties in the form of a solid granulation which includes a dried emulsified mixture of a sodium salt of cellulose acetate phthalate and a water-insoluble therapeutic liquid.

8. A therapeutic agent having enteric properties in the form of a solid granulation which includes a dried emuslified mixture of a sodium salt of cellulose acetate phthalate and a water-insoluble liquid disecondary hexylresorcinol.

9. A therapeutic agent having enteric properties in the form of a solid granulation which includes a dried emulsified mixture of a sodium salt of cellulose acetate phthalate and a water-insoluble oil suspension of penicillin.

10. A therapeutic agent having enteric properties in the form of a solid granulation which includes a dried emulsified mixture of a sodium salt of cellulose acetate phthalate and a water-insoluble oil suspension of pitressin tannate.

HERMAN H. BOGIN.
ERNEST R. JONES.

REFERENCES CITED

The following references are of record in the file of this patent:

UNITED STATES PATENTS

| Number | Name | Date |
|---|---|---|
| 1,124 | Davenport | 1899 |
| 975,405 | Eilertsen | Nov. 15, 1910 |
| 1,021,674 | Horowitz | Mar. 26, 1912 |
| 2,107,307 | Rawlins | Feb. 8, 1938 |
| 2,196,768 | Hiatt | Apr. 9, 1940 |
| 2,390,088 | Fox | Dec. 4, 1945 |
| 2,410,110 | Taylor | Oct. 29, 1946 |
| 2,410,417 | Andersen | Nov. 5, 1946 |
| 2,491,475 | Bogin | Dec. 20, 1949 |

OTHER REFERENCES

Hiss & Ebert—New Standard Formulary, 5th Ed. (1920) pages 33, 34, 35.